(12) United States Patent  
Ogino

(10) Patent No.: US 7,043,065 B2  
(45) Date of Patent: May 9, 2006

(54) IMAGE PROCESSING METHOD, IMAGE PROCESSING APPARATUS, MRI APPARATUS AND RECORDING MEDIUM

(75) Inventor: Tetsuo Ogino, Tokyo (JP)

(73) Assignee: GE Medical Systembs Global Technology Company, LLC., Waukesha, WI (US)

( * ) Notice: Subject to any disclaimer, the term of this patent is extended or adjusted under 35 U.S.C. 154(b) by 1069 days.

(21) Appl. No.: 09/897,875

(22) Filed: Jul. 2, 2001

(65) Prior Publication Data

US 2002/0040718 A1    Apr. 11, 2002

(30) Foreign Application Priority Data

Aug. 29, 2000 (JP) ............................. 2000-258308

(51) Int. Cl.  
*G06K 9/00* (2006.01)

(52) U.S. Cl. .................................................... 382/131

(58) Field of Classification Search ................ 382/128, 382/130, 131, 168, 170, 260, 261, 264, 275; 128/920, 922; 324/307, 309, 318  
See application file for complete search history.

Primary Examiner—Mehrdad Dastouri  
Assistant Examiner—Virginia Kibler  
(74) Attorney, Agent, or Firm—Moonray Kojima

(57) ABSTRACT

For the purpose of accurately calculating the average value M of original complex observed signals S from an absolute-value image produced by the complex observed signals S, in Step A1, the average value Ma of pixel values |S| of the absolute-value image in a local region is calculated by:

$$Ma = \Sigma |S|/k,$$

wherein the number of pixels in the local region is represented as k.

In Step A2, the average value M of the original complex observed signals S is calculated by the following equation:

$$M = \alpha \cdot f^{-1}(Ma/\alpha),$$

wherein $f^{-1}(Ma/\alpha)$ is an inverse function of the function $Ma/\alpha = f(M/\alpha)$ represented as:

$$Ma/\alpha = \int\int \{|M/\alpha + (X+iY)| \exp\{-(X^2+Y^2)/2\}/2\pi\} dX\, dY.$$

20 Claims, 8 Drawing Sheets

$$M = \frac{S1+S2+S3}{3} = 0$$

$$Ma = \frac{|S1| + |S2| + |S3|}{3} = Z$$

IMAGE PROCESSING METHOD, IMAGE PROCESSING APPARATUS, MRI APPARATUS AND RECORDING MEDIUM

BACKGROUND OF THE INVENTION

The present invention relates to an image processing method, image processing apparatus and MRI (magnetic resonance imaging) apparatus, and more particularly to an image processing method and apparatus for calculating the average value of complex observed signals from an absolute-value image produced by the complex observed signals, an image processing method and apparatus for calculating the variance of complex observed signals from an absolute-value image produced by the complex observed signals, an image processing method and apparatus for performing image filtering based on the variance of complex observed signals calculated from an absolute-value image produced by the complex observed signals, and an MRI apparatus comprising such image processing apparatuses.

In the instant specification, drawing, and claims, the following letters, symbols and italicized letters and symbols will be used interchangeably and have the same meanings:
(1) M and M
(2) N and N
(3) S and S
(4) Ma and Ma
(5) K and K
(6) W and W
(7) δ and δ
(8) ξ and ξ

An image processing method has been proposed which performs image filtering on an image produced by complex observed signals S, comprising:

(1) estimating the variance $\alpha^2$ of noise contained in the complex observed signals S, (2) calculating the variance $\delta^2$ of the complex observed signals S in a proximate region of a pixel of interest; and (3) comparing the variance $\alpha^2$ of noise contained in the complex observed signals S and the variance $\delta^2$ of the complex observed signals S, and if the variance $\delta^2$ of the complex observed signals S is equal to or relatively close to the variance $\alpha^2$ of noise, setting a value in which the average value of pixel values of the pixel of interest and the surrounding pixels dominates as the pixel value for the pixel of interest, and if the variance $\delta^2$ of the complex observed signals S is relatively far from the variance $\alpha^2$ of noise, setting a value in which the original pixel value dominates as the pixel value for the pixel of interest.

According to such an image processing method, a higher degree of smoothing is applied to a pixel in a region in which the variance $\delta^2$ of the complex observed signals S is equal to or relatively close to the variance $\alpha^2$ of noise, i.e., a region containing approximately constant signal components, and a lower degree of smoothing is applied to pixels in other regions, i.e., regions containing varying signal components.

The variance $\delta^2$ of complex observed signals S in a proximate region of a pixel of interest is calculated by the following equation, wherein the average value of the complex observed signals S in the region is represented by M, and the number of pixels as N:

$$\delta^2 = \Sigma(S-M)^2/N,$$

in which the average value M is:

$$M = \Sigma S/N.$$

For example, considering complex observed signals $S1=Z\angle 0°$, $S2=Z\angle 120°$ and $S3=Z\angle 240°$ as shown in FIG. 10, $$M=(S1+S2+S3)/3=0.$$

However, the average value Ma of pixel values |S| on an absolute-value image sometimes has a value different from the average value M of the complex observed signals S. For example, the average value Ma of the absolute values |S| of the complex observed signals $S1=Z\angle 0°$, $S2=Z\angle 120°$ and $S3=Z\angle 240°$ shown in FIG. 10 is:

$$Ma=(|S1|+|S2|+|S3|)/3=Z\neq 0.$$

In other words, the conventional technique has the following problems:

(1) the average value M of complex observed signals S may not be accurately obtained from an absolute-value image produced by the complex observed signals S;

(2) if the average value M of the complex observed signals S is not accurately obtained, the variance $\delta^2$ of the complex observed signals S cannot be accurately obtained; and (3) if the variance $\delta^2$ of the complex observed signals S is not be accurately obtained, the image filtering cannot be accurately performed.

SUMMARY OF THE INVENTION

It is therefore a first object of the present invention to provide an image processing method and apparatus for accurately calculating the average value M of complex observed signals S from an absolute-value image produced by the complex observed signals S.

It is a second object of the present invention to provide an image processing method and apparatus for accurately calculating the variance $\delta^2$ of complex observed signals S from an absolute-value image produced by the complex observed signals S.

It is a third object of the present invention to provide an image processing method and apparatus for performing image filtering based on the variance $\delta^2$ of complex observed signals S calculated from an absolute-value image produced by the complex observed signals S.

It is a fourth object of the present invention to provide an MRI apparatus, which is representative of apparatuses for producing an absolute-value image from complex observed signals S, comprising the aforementioned image processing apparatus.

It is a fifth object of the present invention to provide a recording medium for making a computer perform the aforementioned image processing method.

In accordance with a first aspect of the present invention, there is provided an image processing method for calculating from an absolute-value image produced by complex observed signals S an average value M of the original complex observed signals S in a local region on the absolute-value image, characterized in that the method comprises: calculating the average value M by:

$$M=\alpha \cdot f^{-1}(Ma/\alpha),$$

wherein the function $Ma/\alpha=f(M/\alpha)$ is represented by:

$$Ma/\alpha=\int\int\{|M/\alpha+(X+iY)|\exp\{-(X^2+Y^2)/2\}/2\pi\}dX\,dY,$$

the standard deviation of noise contained in the complex observed signals S is represented by $\alpha$, and the average value of pixel values in the local region is represented as Ma.

When noise with Gaussian distribution having a standard deviation of $\alpha$ is included in complex signal components S having an average value of M, the average value Ma of the absolute values of the complex observed signals S is:

$$Ma = \int\int \{|M/\alpha + (x+iy)|\exp\{-x^2/2\alpha^2\}/\alpha\sqrt{2\pi} \cdot \exp\{-y^2/2\alpha^2\}/\alpha\sqrt{2\pi}\}dx\,dy.$$

Substituting $x/\alpha = X$, and $y/\alpha = Y$.

$$Ma = \int\int \{|M/\alpha + \alpha(X+iY)|\exp\{-(X^2+Y^2)/2\}/2\pi\}dX\,dY.$$

Dividing the both sides by $\alpha$, $$Ma/\alpha = \int\int \{|M/\alpha + (X+iY)|\exp\{-(X^2+Y^2)/2\}/2\pi\}dX\,dY.$$

In other words, Ma and M can be related to each other via the unique function $Ma/\alpha = f(M/\alpha)$.

Therefore, in the image processing method of the first aspect, the inverse function $f^{-1}(Ma/\alpha)$ of the unique function $Ma/\alpha = f(M/\alpha)$ is used to calculate the average value M of complex observed signals S from the average value Ma of pixel values in a local region on an absolute-value image. This enables the average value M of complex observed signals S to be accurately calculated even from an absolute-value image produced by the complex observed signals S.

The standard deviation $\alpha$ of noise may be experimentally obtained beforehand, obtained using a conventional method, or be calculated in accordance with the second aspect of the present invention set out below.

In accordance with a second aspect of the present invention, there is provided the image processing method of the foregoing configuration, characterized in that an inverse function $F^{-1}(Ma/\alpha)$ of an approximated function $F(M/\alpha)$ of the function $f(M/\alpha)$ is used instead of $f^{-1}(Ma/\alpha)$.

In the image processing method of the second aspect, the calculation time can be reduced because an approximated function $F(M/\alpha)$ is used. The approximated function $F(M/\alpha)$ can be generated based on the calculation result obtained by numerically integrating:

$$Ma/\alpha = \int\int \{|M/\alpha + (X+iY)|\exp\{-(X^2+Y^2)/2\}/2\pi\}dX\,dY.$$

In accordance with a third aspect of the present invention, there is provided the image processing method of the foregoing configuration, characterized in that the method comprises: producing a first average-value image by applying a two-dimensional smoothing filter to the absolute-value image; producing a differential image by subtracting the average-value image from the original absolute-value image; producing a differential square image by squaring pixel values in the differential image; producing a second average-value image by applying a two-dimensional smoothing filter to the differential square image, generating a histogram of pixel values in the second average-value image; and calculating a standard deviation $\alpha$ of noise from a peak position appearing on the histogram.

Focusing attention on one pixel in the absolute-value image as a pixel of interest, the average value Ma of a local region surrounding the pixel of interest is calculated, and the square sum $\xi$ of the difference between the average value Ma and the pixel value $|S|$ of each pixel in the local region is calculated as follows:

$$\xi = \Sigma(|S| - Ma)^2.$$

This process is repeated for all the pixels, and $\xi$'s for all the pixels are obtained.

When noise with Gaussian distribution having a standard deviation $\alpha$ is included, the distribution of $\xi$ in an image region having constant signal components approaches the Gaussian distribution if the number of pixels k in the local region is sufficiently large. Hence, the peak position Pc of the distribution of $\xi$ is approximately $k \cdot \alpha^2$. On the other hand, the distribution of $\xi$ in a background region having no signal components has Rayleigh distribution (due to the absolute-value image). Hence, the peak position Pb of the distribution of $\xi$ is $(2-\pi/2) \cdot k \cdot \alpha^2$. Thus, the standard deviation $\alpha$ of noise can be calculated from the peak position Pc or Pb of the distribution of $\xi$.

In the image processing method of the third aspect, the pixel value in the second average-value image is $\xi$. Therefore, the standard deviation $\alpha$ of noise can be calculated by generating a histogram of pixel values in the second average-value image and obtaining its peak position.

In accordance with a fourth aspect of the present invention, there is provided the image processing method of the foregoing configuration, characterized in that the method comprises: producing a first average-value image by applying a two-dimensional smoothing filter to the absolute-value image; producing a differential image by subtracting the average-value image from the original absolute-value image; producing a differential square image by squaring pixel values in the differential image; producing a second average-value image by applying a two-dimensional smoothing filter to the differential square image; generating a histogram of pixel values in the second average-value image; performing curve fitting on the histogram to obtain a curve function; and calculating a standard deviation $\alpha$ of noise from parameters of the curve function.

In the image processing method of the fourth aspect, a curve function representing the distribution of $\xi$ can be obtained by performing curve fitting on a histogram of pixel values in the second average-value image. The curve function has Gaussian distribution or Rayleigh distribution, and the standard deviation $\alpha$ of noise can be calculated from parameters of the function.

In accordance with a fifth aspect of the present invention, there is provided the image processing method of the foregoing configuration, characterized in that a Gaussian distribution function is used as the curve function.

In the image processing method of the fifth aspect, since the curve fitting is performed using a Gaussian distribution function, the method is useful for an absolute-value image having many local regions containing constant signal components.

In accordance with a sixth aspect of the present invention, there is provided the image processing method of the foregoing configuration, characterized in that a Rayleigh distribution function is used as the curve function.

In the image processing method of the sixth aspect, since the curve fitting is performed using a Rayleigh distribution function, the method is useful for an absolute-value image having many background regions.

In accordance with a seventh aspect of the present invention, there is provided an image processing method for calculating from an absolute-value image produced by complex observed signals S a variance $\delta^2$ of the original complex observed signals S in a local region on the absolute-value image, characterized in that the method comprises: calculating an average value M by the image processing method of the foregoing configuration; calculating $\Sigma |S|^2/k$ by dividing a square sum of pixel values $|S|$ of the absolute-value image in the local region by the number of pixels k; and calculating the variance $\delta^2$ by:

$$\delta^2 = \Sigma |S|^2/k - M^2.$$

When complex observed signal is represented as S, the average value of the complex observed signals S as M, the variance as $\delta^2$, and the number of observation points as k, $$M = \Sigma S/k, \text{ and}$$

$$\delta^2 = \Sigma(S-M)^2/k.$$

Rewriting these equations, the following is obtained:

$$\delta^2 = \sum (S^2 - 2S \cdot M + M^2)/k$$
$$= \sum S^2/k - 2M \cdot \sum S/k + \sum M^2/k$$
$$= \sum S^2/k - 2M^2 + M^2$$
$$= \sum |S|^2/k - M^2.$$

Therefore, in the image processing method of the seventh aspect, $\Sigma|S|^2/k$ is obtained from the pixel values $|S|$ in the absolute-value image; $M^2$ is obtained using the image processing method of the first aspect; and then the variance $\delta^2$ can be obtained from the difference therebetween.

In accordance with an eighth aspect of the present invention, there is provided an image processing method characterized in that the method comprises: calculating a variance $\delta^2$ of original complex observed signals S in a proximate region of a pixel of interest on an absolute-value image produced by the complex observed signals S according to the image processing method of the foregoing configuration; comparing a variance $\alpha^2$ of noise contained in the complex observed signals S and the variance $\delta^2$ of the complex observed signals S; and if the variance $\delta^2$ of the complex observed signals S is equal to or relatively close to the variance $\alpha^2$ of noise, setting the pixel value for the pixel of interest to a value in which the average value of pixel values of the pixel of interest and the surrounding pixels dominates, and if the variance $\delta^2$ of the complex observed signals S is relatively far from the variance $\alpha^2$ of noise, setting the pixel value for the pixel of interest to a value in which the original pixel value dominates.

In the image processing method of the eighth aspect, image filtering can be performed in which the degree of smoothing is increased for a pixel in a region having the variance $\delta^2$ of complex observed signals S equal to or relatively close to the variance $\alpha^2$ of noise, i.e., a region containing approximately constant signal components; and the degree of smoothing is decreased for pixels in other regions, i.e., regions containing varying signal components. Then, the variance $\delta^2$ is obtained using the image processing method of the sixth aspect, and the image filtering can therefore be accurately performed even on an absolute-value image.

In accordance with a ninth aspect of the present invention, there is provided the image producing method of the foregoing configuration, characterized in that the method comprises: calculating a ratio between the variance $\delta^2$ of the complex observed signals S and the variance $\alpha^2$ of noise; setting a weight W=1 when the ratio is equal to "1" and reducing the weight W from "1" as the ratio goes away from "1"; and calculating a new pixel value $|S|_{new}$ for the pixel of interest by:

$$|S|_{new} = W \cdot Ma + (1-W)|S|,$$

wherein the pixel value of the pixel of interest is represented as $|S|$, and the average value of pixel values of the pixel of interest and the surrounding pixels is represented as Ma.

In the image processing method of the ninth aspect, image filtering can be performed in which the degree of smoothing is increased as the variance $\delta^2$ of the complex observed signals S comes close to the variance $\alpha^2$ of noise, and the degree of smoothing is decreased as the variance $\delta^2$ of the complex observed signals S goes away from the variance $\alpha^2$ of noise.

In accordance with a tenth aspect of the present invention, there is provided an image processing apparatus for calculating from an absolute-value image produced by complex observed signals S an average value M of the original complex observed signals S in a local region on the absolute-value image, characterized in that the apparatus comprises: first calculating means for calculating an average value Ma of pixel values in a region; and second calculating means for calculating the average value M by:

$$M = \alpha \cdot f^{-1}(Ma/\alpha),$$

wherein the function $Ma/\alpha = f(M/\alpha)$ is represented by:

$$Ma/\alpha = \int\int \{|M/\alpha + (X+iY)|\exp\{-(X^2+Y^2)/2\}/2\pi\} dX\, dY,$$

and the standard deviation of noise contained in the complex observed signals S is represented by $\alpha$.

In the image processing apparatus of the tenth aspect, the image processing method as described regarding the first aspect can be suitably performed.

In accordance with an eleventh aspect of the present invention, there is provided the image processing apparatus of the foregoing configuration, characterized in that said second calculating means uses an inverse function $F^{-1}(Ma/\alpha)$ of an approximated function $F(M/\alpha)$ of the function $f(M/\alpha)$ instead of $f^{-1}(Ma/\alpha)$.

In the image processing apparatus of the eleventh aspect, the image processing method as described regarding the second aspect can be suitably performed.

In accordance with a twelfth aspect of the present invention, there is provided the image processing apparatus of the foregoing configuration, characterized in that the apparatus comprises: first average-value image producing means for producing a first average-value image by applying a two-dimensional smoothing filter to the absolute-value image; differential image producing means for producing a differential image by subtracting the average-value image from the original absolute-value image; differential square image producing means for producing a differential square image by squaring pixel values in the differential image; second average-value image producing means for producing a second average-value image by applying a two-dimensional smoothing filter to the differential square image; histogram generating means for generating a histogram of pixel values in the second average-value image; and standard deviation calculating means for calculating a standard deviation $\alpha$ of noise from a peak position appearing on the histogram.

In the image processing apparatus of the twelfth aspect, the image processing method as described regarding the third aspect can be suitably performed.

In accordance with a thirteenth aspect of the present invention, there is provided the image processing apparatus of the foregoing configuration, characterized in that the apparatus comprises: first average-value image producing means for producing a first average-value image by applying a two-dimensional smoothing filter to the absolute-value image; differential image producing means for producing a differential image by subtracting the average-value image from the original absolute-value image; differential square image producing means for producing a differential square image by squaring pixel values in the differential image; second average-value image producing means for producing a second average-value image by applying a two-dimensional smoothing filter to the differential square image; histogram generating means for generating a histogram of pixel values in the second average-value image curve fitting means for performing curve fitting on the histogram to obtain a curve function; and standard deviation calculating means for calculating a standard deviation $\alpha$ of noise from parameters of the curve function.

In the image processing apparatus of the thirteenth aspect, the image processing method as described regarding the fourth aspect can be suitably performed.

In accordance with a fourteenth aspect of the present invention, there is provided the image processing apparatus of the foregoing configuration, characterized in that said curve fitting means uses a Gaussian distribution function as the curve function.

In the image processing apparatus of the fourteenth aspect, the image processing method as described regarding the fifth aspect can be suitably performed.

In accordance with a fifteenth aspect of the present invention, there is provided the image processing apparatus of the foregoing configuration, characterized in that said curve fitting means uses a Rayleigh distribution function as the curve function.

In the image processing apparatus of the fifteenth aspect, the image processing method as described regarding the sixth aspect can be suitably performed.

In accordance with a sixteenth aspect of the present invention, there is provided an image processing apparatus for calculating from an absolute-value image produced by complex observed signals S a variance $\delta^2$ of the original complex observed signals S in a local region on the absolute-value image, characterized in that the apparatus comprises: the image processing apparatus as described regarding the tenth or eleventh aspect; first-term calculating means for calculating $\Sigma|S|^2/k$ by dividing a square sum of pixel values |S| of the absolute-value image in a region by the number of pixels; and variance calculating means for calculating the variance $\delta^2$ by:

$$\delta^2 = \Sigma|S|^2/k - M^2.$$

In the image processing apparatus of the sixteenth aspect, the image processing method as described regarding the seventh aspect can be suitably performed.

In accordance with a seventeenth aspect of the present invention, there is provided an image processing apparatus characterized in that the apparatus comprises: the image processing apparatus as described regarding the sixteenth aspect for calculating a variance $\delta^2$ of original complex observed signals S in a proximate region of a pixel of interest on an absolute-value image produced by the complex observed signals S; comparing means for comparing a variance $\alpha^2$ of noise contained in the complex observed signals S and the variance $\delta^2$ of the complex observed signals S; and image filtering means for, if the variance $\delta^2$ of the complex observed signals S is equal to or relatively close to the variance $\alpha^2$ of noise, setting the pixel value for the pixel of interest to a value in which the average value of pixel values of the pixel of interest and the surrounding pixels dominates, and if the variance $\delta^2$ of the complex observed signals S is relatively far from the variance $\alpha^2$ of noise, setting the pixel value for the pixel of interest to a value in which the original pixel value dominates.

In the image processing apparatus of the seventeenth aspect, the image processing method as described regarding the eighth aspect can be suitably performed.

In accordance with an eighteenth aspect of the present invention, there is provided the image producing apparatus of the foregoing configuration, characterized in that said image filtering means calculates a ratio between the variance $\delta^2$ of the complex observed signals S and the variance $\alpha^2$ of noise; sets a weight W=1 when the ratio is equal to "1" and reduces the weight W from "1" as the ratio goes away from "1"; and calculates a new pixel value $|S|_{new}$ for the pixel of interest by:

$$|S|_{new} = W \cdot Ma + (1-W)|S|,$$

wherein the pixel value of the pixel of interest is represented as |S|, and the average value of pixel values of the pixel of interest and the surrounding pixels is represented as Ma.

In the image processing apparatus of the eighteenth aspect, the image processing method as described regarding the ninth aspect can be suitably performed.

In accordance with a nineteenth aspect of the present invention, there is provided an MRI apparatus characterized in that the apparatus comprises the image processing apparatus of the foregoing configuration.

In the MRI apparatus of the nineteenth aspect, image filtering on an absolute-value image can be suitably performed.

In accordance with a twentieth aspect of the present invention, there is provided a recording medium characterized in that the medium records in a computer-readable manner a program for making a computer perform the image processing method of the foregoing configuration.

The recording medium of the twentieth aspect enables the image processing method of the foregoing configuration to be suitably performed by a computer.

According to the image processing method and apparatus of the present invention, the following effects can be obtained:

(1) the average value M of complex observed signals S can be accurately calculated from an absolute-value image produced by the complex observed signals S;

(2) the variance $\delta^2$ of complex observed signals S can be accurately calculated from an absolute-value image produced by the complex observed signals S; and (3) image filtering can be accurately performed, and the image quality can be improved.

According the MRI apparatus of the present invention, the image quality of an MR image can be improved.

By utilizing the recording medium of the present invention, the image processing according to the present invention can be performed by a computer.

Further objects and advantages of the present invention will be apparent from the following description of the preferred embodiments of the invention as illustrated in the accompanying drawings.

DETAILED DESCRIPTION OF THE INVENTION

The present invention will now be described in more detail with reference to embodiments shown in the accompanying drawings.

Figure 1:
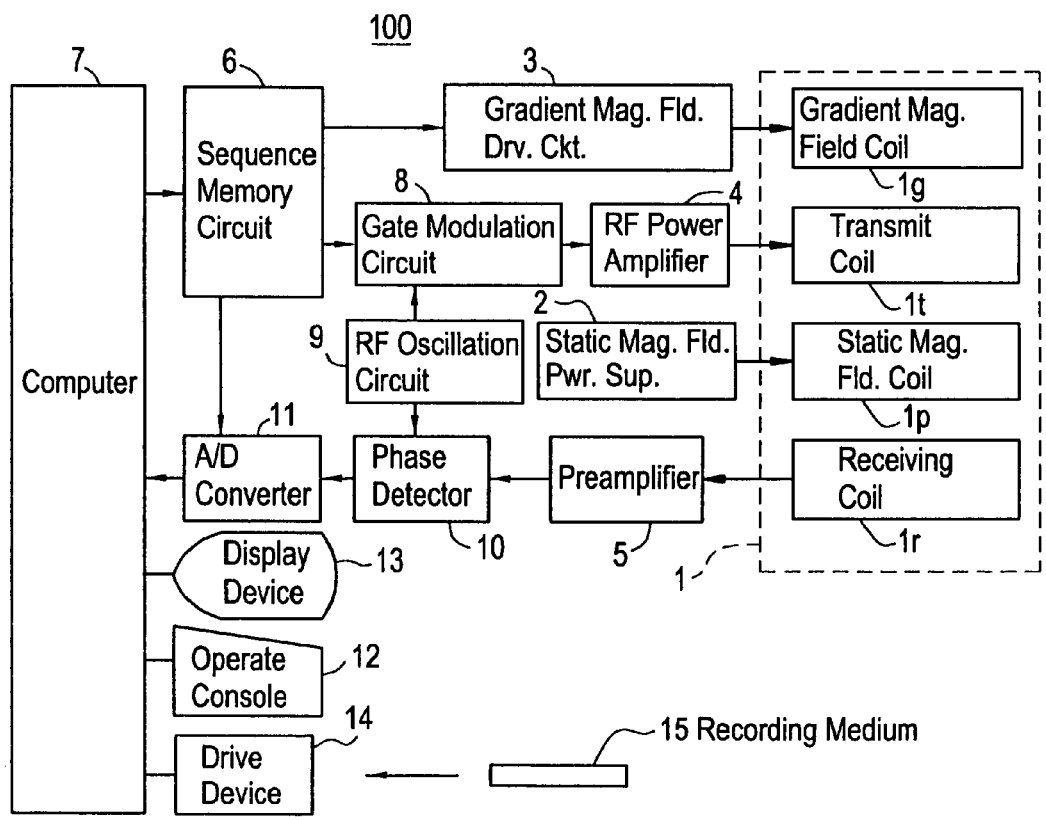
FIG. 1 is a block diagram showing an MRI apparatus in accordance with one embodiment of the present invention.

FIG. 1 is a block diagram showing an MRI apparatus in accordance with one embodiment of the present invention.

In the MRI apparatus 100, a magnet assembly 1 has an empty portion (bore) therein for inserting a subject, and surrounding the empty portion are disposed a static magnetic field coil 1p for applying a constant static magnetic field to the subject; a gradient magnetic field coil 1g for generating gradient magnetic fields along X-, Y- and Z-axes; a transmit coil 1t for supplying an RF pulse to excite spins of atomic nuclei within the subject; and a receive coil 1r for detecting an NMR signal from the subject. The static magnetic field coil 1p, gradient magnetic field coil 1g, transmit coil 1t and receive coil 1r are connected to a static magnetic field power supply 2, a gradient magnetic field drive circuit 3, an RF power amplifier 4 and a preamplifier 5, respectively.

A sequence memory circuit 6 operates the gradient magnetic field drive circuit 3 based on a stored pulse sequence in response to instructions from a computer 7, to generate the gradient magnetic fields from the gradient magnetic field coil 1g in the magnet assembly 1. The sequence memory circuit 6 also operates a gate modulation circuit 8 to modulate a carrier output signal from an RF oscillation circuit 9 into a pulsed signal having a predefined timing and envelope shape. The pulsed signal is applied to the RF power amplifier 4 as an RF pulse, power-amplified in the RF power amplifier 4, and applied to the transmit coil 1t in the magnet assembly 1 to selectively excite a desired imaging plane.

The preamplifier 5 amplifies an NMR signal from the subject detected at the receive coil 1r in the magnet assembly 1, and inputs the signal to a phase detector 10. The phase detector 10 phase-detects the NMR signal from the preamplifier 5 with reference to the carrier output signal from the RF oscillation circuit 9, and supplies the phase-detected signal to an A/D converter 11. The A/D converter 11 converts the phase-detected analog NMR signal into digital data, and inputs it to the computer 7.

The computer 7 reads the digital data from the A/D converter 11, and performs an image reconstruction operation to produce an MR image.

A display device 13 displays the MR image.

The computer 7 is also responsible for overall control such as receiving information input from an operate console 12.

Moreover, the computer 7 reads from a drive device 14 a program recorded on a recording medium 15, such as a CD (compact disk), MOD (magneto-optical disk) or OD (optical disk), to perform calculation processing for the standard deviation of noise, which will be described later with reference to FIGS. 2–4; image filtering processing, which will be described later with reference to FIGS. 5–6; calculation processing for the average value, which will be described later with reference to FIGS. 7–8; and calculation processing for the variance, which will be described later with reference to FIG. 9.

Figure 2:
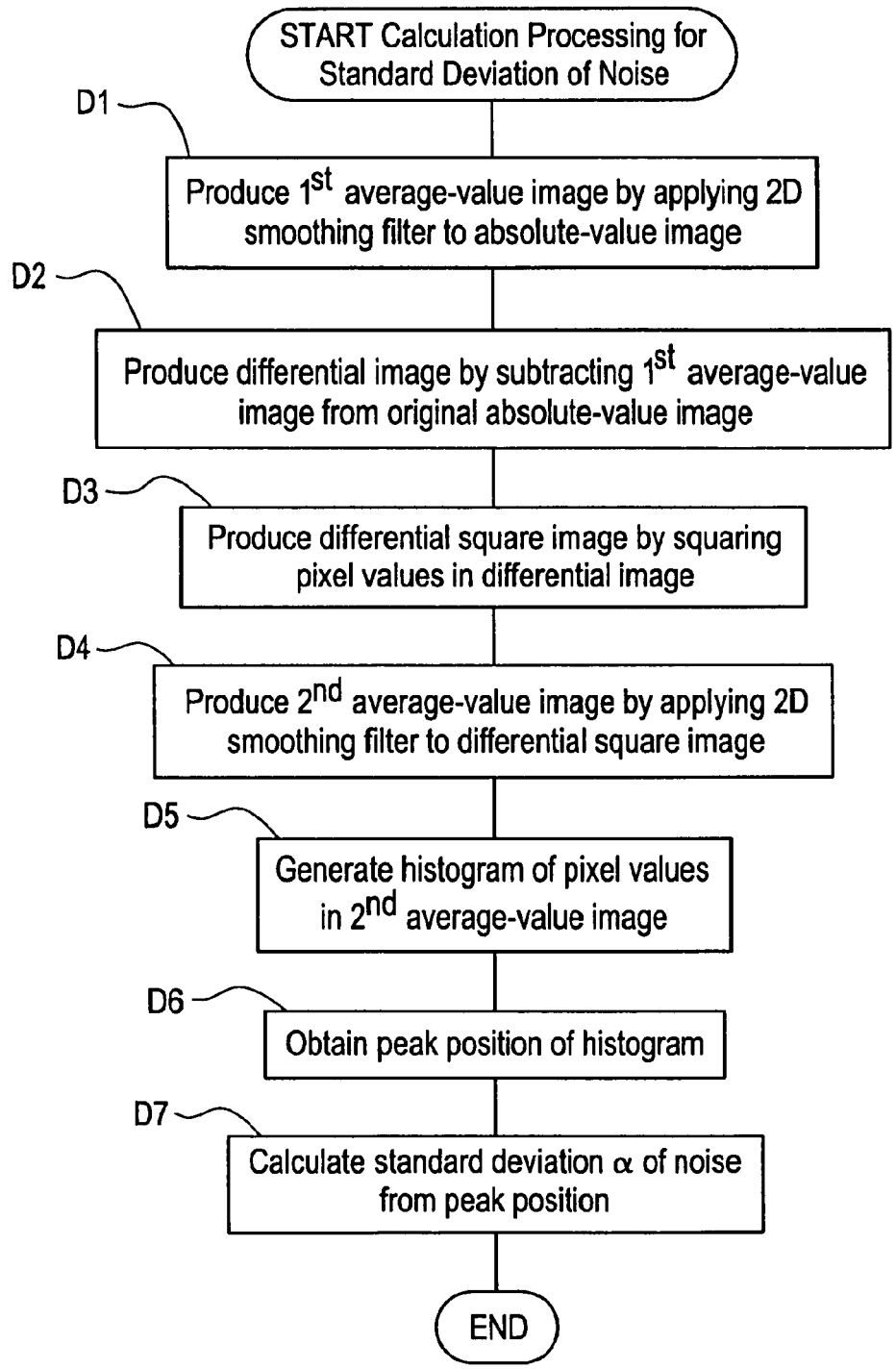
FIG. 2 is a flow chart showing calculation processing for the standard deviation of noise conducted by the MRI apparatus of FIG. 1.
Figure 3:
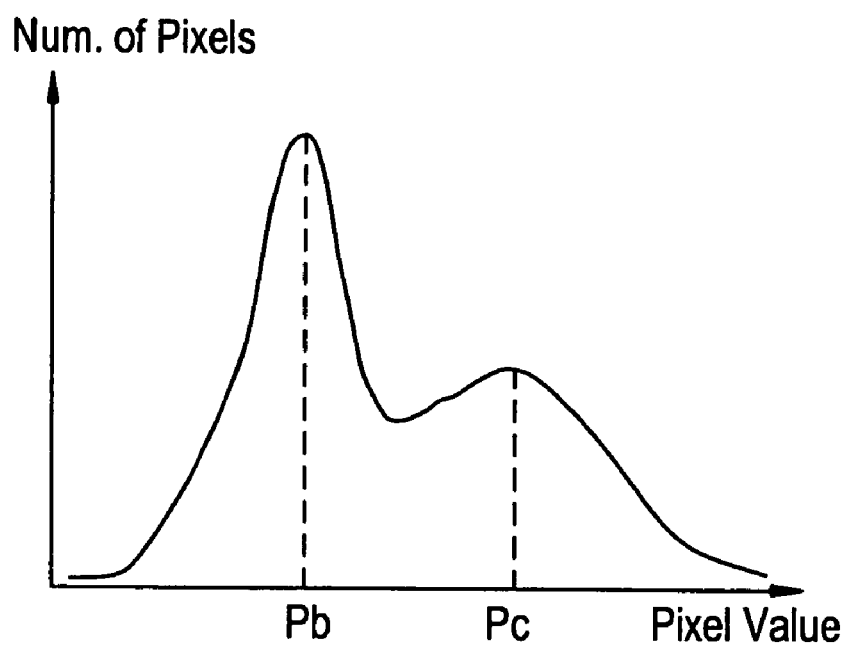
FIG. 3 is an exemplary diagram of a histogram generated in the calculation processing for the standard deviation of noise.

FIG. 2 is a flow chart showing calculation processing for the standard deviation of noise conducted by the computer 7.

In Step D1, a first average-value image is produced by applying a two-dimensional spatial filter of, for example, 9×9, to an absolute-value image (MR image) produced by complex observed signals (digital data) S.

In Step D2, a differential image is produced by subtracting the first average-value image from the original absolute-value image.

In Step D3, a differential square image is produced by squaring pixel values in the differential image.

In Step D4, a second average-value image is produced by applying a two-dimensional spatial filter of, for example, 9×9, to the differential square image.

In Step D5, a histogram of pixel values in the second average-value image is generated.

In Step D6, a peak of the histogram is obtained. In general, the histogram has a shape as shown in FIG. 3, and has two peaks. The pixel value (position) of a peak having a smaller pixel value is represented as Pb, and the pixel value (position) of a peak having a larger pixel value is represented as Pc.

In Step D7, the standard deviation $\alpha$ of noise is calculated by either of the following equations:

$$\alpha = \sqrt{Pb/((2-\pi/2)\cdot k)}, \text{ or}$$

$$\alpha = \sqrt{Pc/k},$$

wherein k=9×9=81, for example.

Moreover, it is preferred that curve fitting be performed in Step D6 in order to obtain the peak of the histogram. In this case, an appropriate curve function may be used because only the peak position needs to be obtained. It will also be easily recognized that a Gaussian distribution function or a Rayleigh distribution function may be used.

Figure 4:
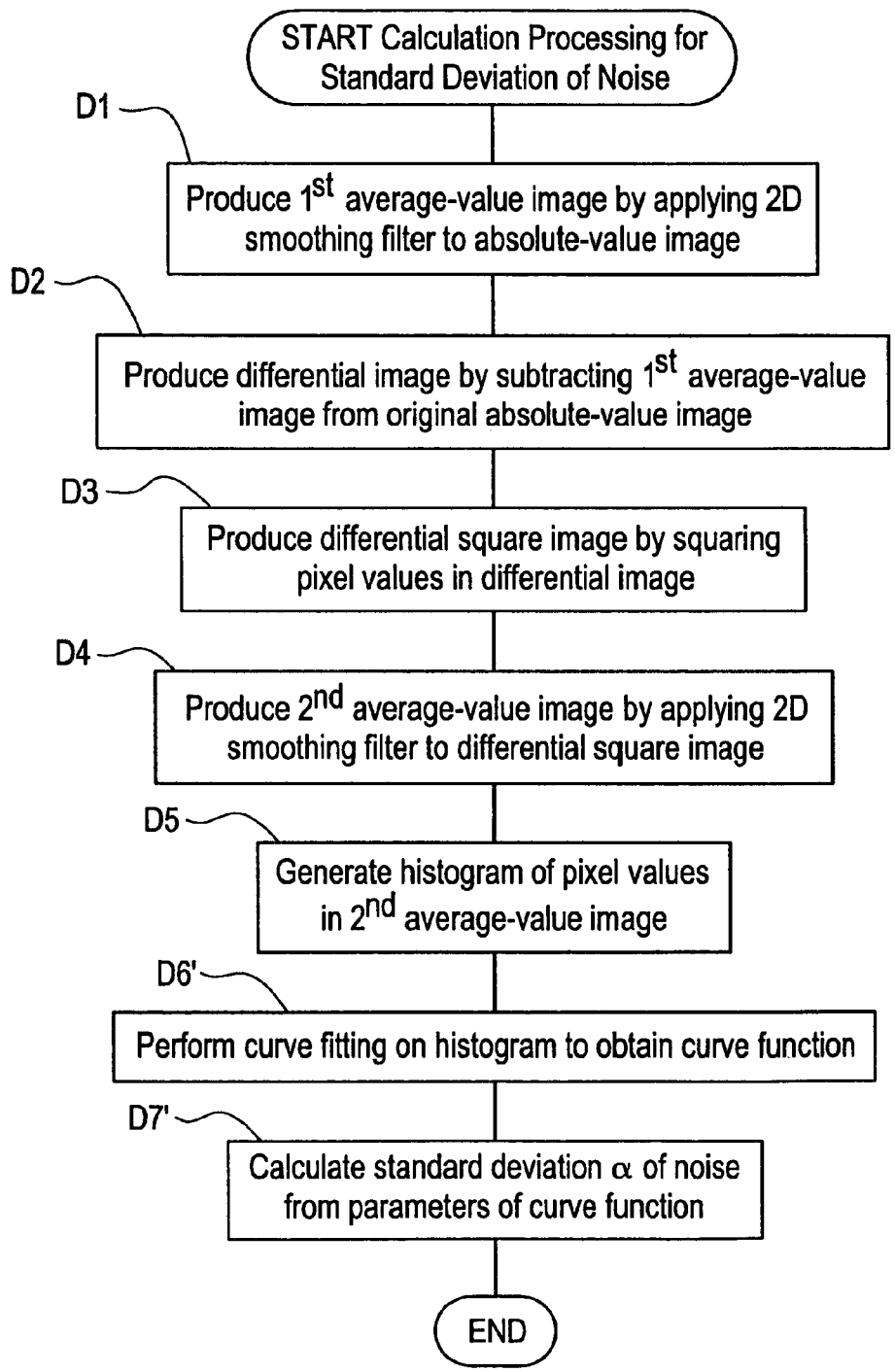
FIG. 4 is a flow chart showing another example of the calculation processing for the standard deviation of noise conducted by the MRI apparatus of FIG. 1

FIG. 4 is a flow chart showing another example of the calculation processing of the standard deviation of noise conducted by the computer 7.

In Step D1, a first average-value image is produced by applying a two-dimensional spatial filter of, for example, 9×9, to an absolute-value image (MR image) produced by complex observed signals (digital data) S.

In Step D2, a differential image is produced by subtracting the first average-value image from the original absolute-value image.

In Step D3, a differential square image is produced by squaring pixel values in the differential image.

In Step D4, a second average-value image is produced by applying a two-dimensional spatial filter of, for example, 9×9, to the differential square image.

In Step D5, a histogram of pixel values in the second average-value image is generated.

In Step D6', curve fitting is performed to obtain a curve function. At this time, a Rayleigh distribution function is used in the proximity of a peak having a smaller pixel value, and a Gaussian distribution function is used in the proximity of a peak having a larger pixel value.

In Step D7', the standard deviation $\alpha$ of noise is calculated from parameters of the curve function.

Figure 5:
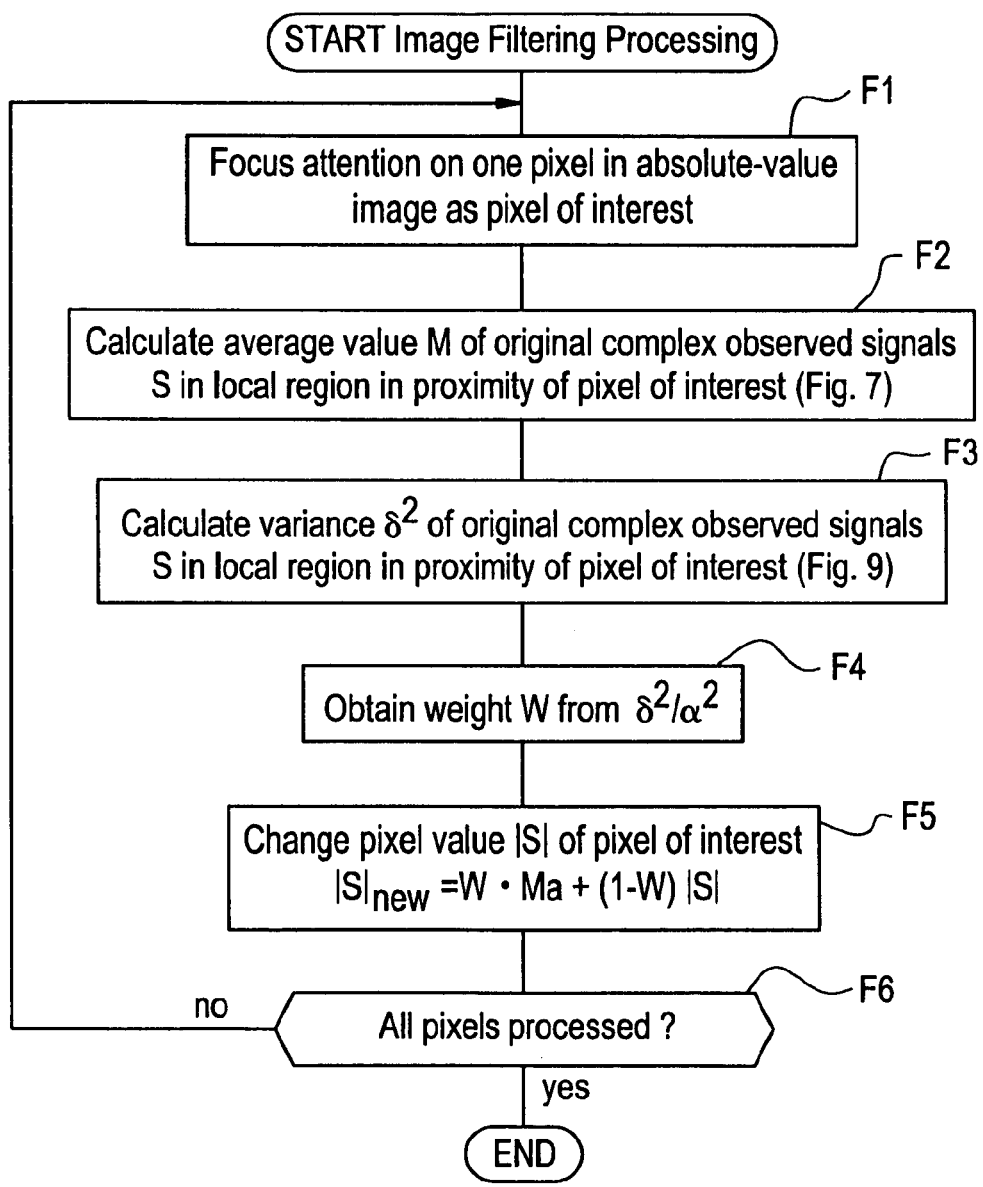
FIG. 5 is a flow chart showing image filtering processing conducted by the MRI apparatus of FIG. 1.
Figure 6:
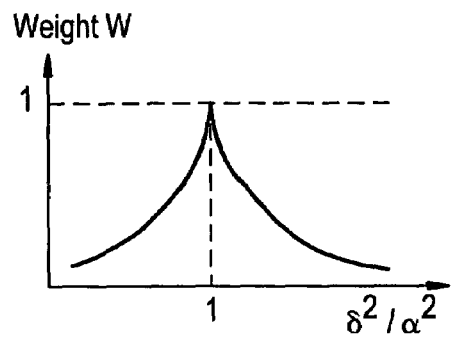
FIG. 6 is a diagram explaining a weight obtained in the image filtering processing.

FIG. 5 is a flow chart showing image filtering processing conducted by the computer 7.

In Step F1, one pixel is taken up as a pixel of interest in an absolute-value image (MR image) produced by complex observed signals (digital data) S.

In Step F2, the average value M of the original complex observed signals S in a local region in the proximity of the pixel of interest is calculated. The calculation processing for the average value will be described later with reference to FIG. 7.

In Step F3, the variance $\delta^2$ of the original complex observed signals S in the local region in the proximity of the pixel of interest is calculated. The calculation processing for the variance will be described later with reference to FIG. 9.

In Step F4, a weight W is obtained from $\delta^2/\alpha^2$. As shown in FIG. 6, the weight W has a value such that it is "1" when $\delta^2/\alpha^2$ is equal to "1", and decreases from "1" as the $\delta^2/\alpha^2$ goes away from "1".

In Step F5, the pixel value |S| of the pixel of interest and the average value Ma are weighted and added to obtain a new pixel value $|S|_{new}$ for the pixel of interest:

$$|S|_{new} = W \cdot Ma + (1-W)|S|.$$

In Step F6, Steps F1–F5 are repeated for all the pixels in the absolute-value image.

Figure 7:
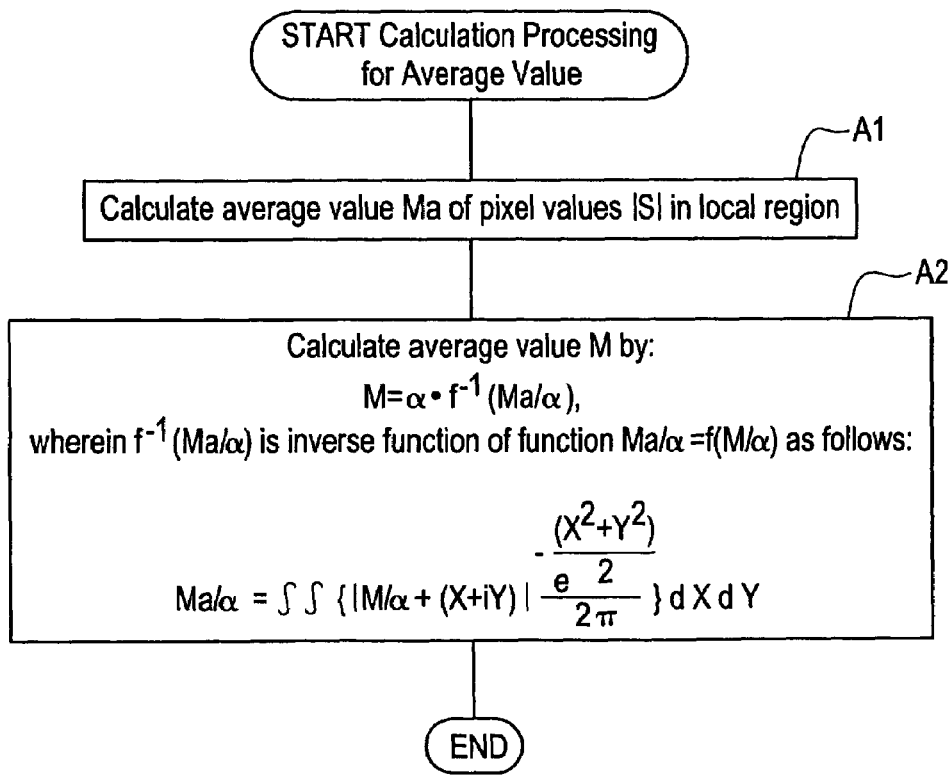
FIG. 7 is a flow chart showing calculation processing for the average value conducted by the MRI apparatus of FIG. 1.

FIG. 7 is a flow chart showing calculation processing for the average value conducted by the computer 7.

In Step A1, the average value Ma of pixel values |S| in a local region is calculated:

$$Ma = \Sigma |S|/k.$$

In Step A2, the average value M is calculated by:

$$M = \alpha \cdot f^{-1}(Ma/\alpha),$$

wherein $f^{-1}(Ma/\alpha)$ is an inverse function of the function $Ma/\alpha = f(M/\alpha)$ represented as:

$$Ma/\alpha = \int\int \{|M/\alpha+(X+iY)|\exp\{-(X^2+Y^2)/2\}/2\pi\} dX\, dY.$$

Figure 8:
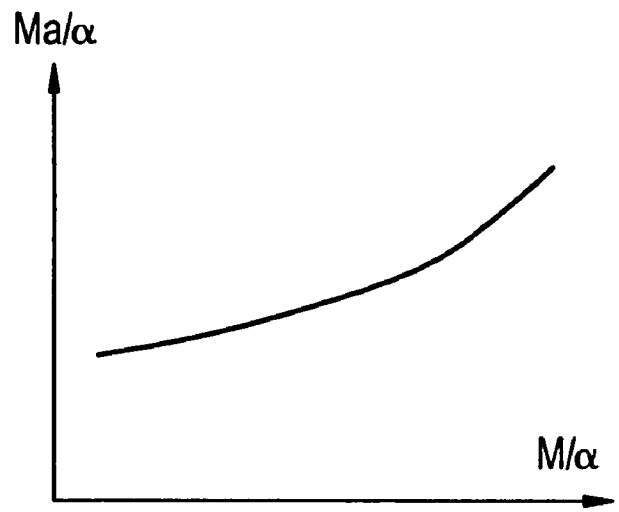
FIG. 8 is a diagram explaining a function used in the calculation processing for the average value.
Figure 10:
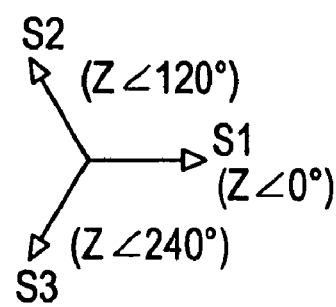
FIG. 10 is a diagram explaining a case in which the average value of complex values and the average value of absolute values are different.

FIG. 8 illustrates the concept of the function $Ma/\alpha = f(M/\alpha)$. The reason why the average value Ma of pixel values in a local region and the average value M of original complex observed signals S can be uniquely related to each other via the function $Ma/\alpha = f(M/\alpha)$ was explained earlier.

Moreover, it is preferred that an approximated function $F(M/\alpha)$ be generated based on the calculation result obtained by numerically integrating:

$$Ma/\alpha = \int\int \{|M/\alpha+(X+iY)|\exp\{-(X^2+Y^2)/2\}/2\pi\} dX\, dY,$$

and an inverse function $F^{-1}(Ma/\alpha)$ of the approximated function $F(M/\alpha)$ be used instead of $f^{-1}(Ma/\alpha)$, in that the calculation time can be reduced.

Figure 9:
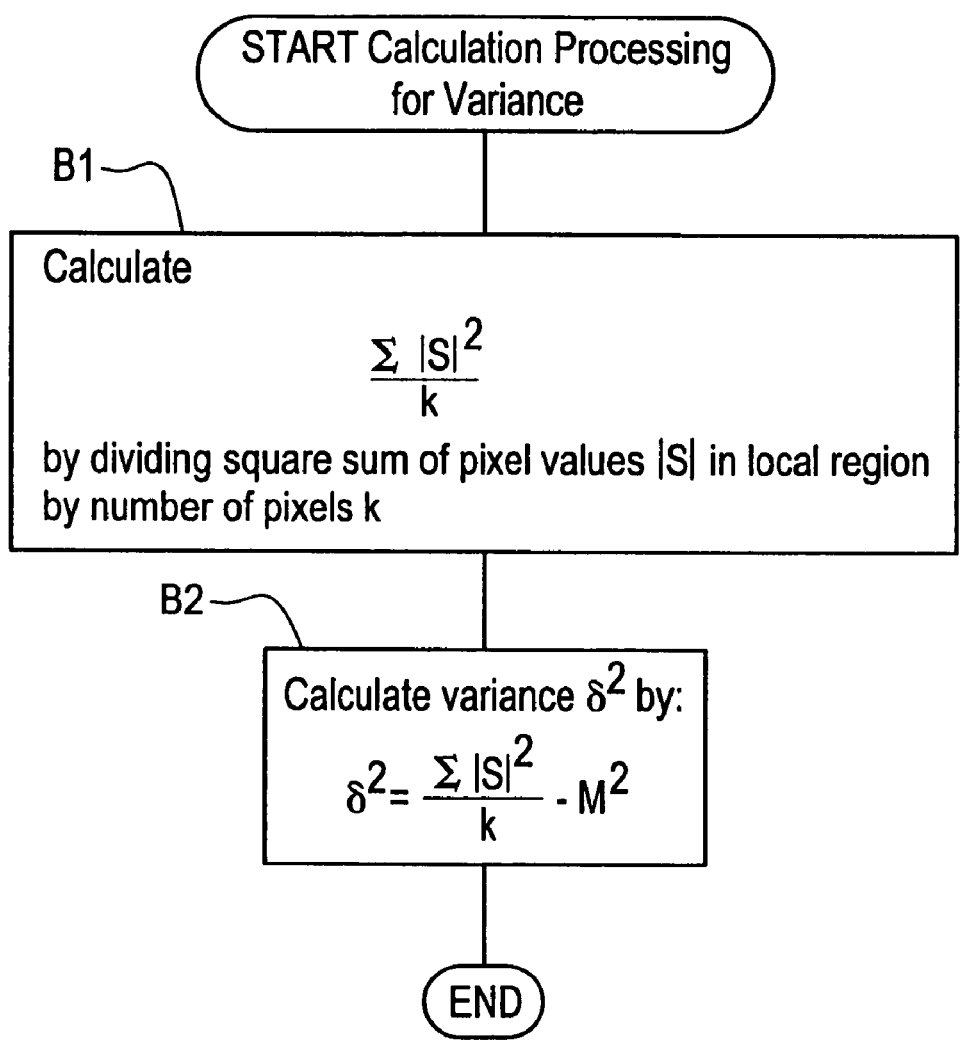
FIG. 9 is a flow chart showing calculation processing for the variance conducted by the MRI apparatus of FIG. 1.

FIG. 9 is a flow chart showing calculation processing for the variance conducted by the computer 7.

In Step B1, the square sum of pixel values |S| in a local region is obtained, and is then divided by the number of pixels k to calculate:

$$\Sigma |S|^2/k.$$

In Step B2, the variance $\delta^2$ is calculated by:

$$\delta^2 = \Sigma |S|^2/k - M^2.$$

The reason why the variance $\delta^2$ of original complex observed signals S can be obtained by the above equation was explained earlier.

According the foregoing MRI apparatus 100, image filtering can be suitably performed even on an absolute-value image, and the image quality can be improved.

Many widely different embodiments of the invention may be configured without departing from the spirit and the scope of the present invention. It should be understood that the present invention is not limited to the specific embodiments described in the specification, except as defined in the appended claims.

The invention claimed is:

1. An image processing method for calculating from an absolute-value image produced by complex observed signals S an average value M of the original complex observed signals S in a local region on the absolute-value image, comprising the step of:
    calculating the average value M by:

$$M = \alpha \cdot f^{-1}(Ma/\alpha),$$

wherein the function $Ma/\alpha = f(M/\alpha)$ is represented by:

$$Ma/\alpha = \int\int \{|M/\alpha+(X+iY)|\exp\{-(X^2+Y^2)/2\}/2\pi\} dX\, dY,$$

the standard deviation of noise contained in the complex observed signals S is represented by $\alpha$, the average value of pixel values in the local region is represented as Ma, and the respective axes along which the gradients are generated are represented by X and Y.

2. The image processing method of claim 1, wherein an inverse function $F^{-1}(Ma/\alpha)$ of an approximated function $F(M/\alpha)$ of the function $f(M/\alpha)$ is used instead of $f^{-1}(Ma/\alpha)$.

3. The image processing method of claim 1, further comprising the steps of:
    producing a first average-value image by applying a two-dimensional smoothing filter to the absolute-value image; producing a differential image by subtracting the average-value image from the original absolute-value image; producing a differential square image by squaring pixel values in the differential image; producing a second average-value image by applying a two-dimensional smoothing filter to the differential square image; generating a histogram of pixel values in the second average-value image; and calculating a standard deviation $\alpha$ of noise from a peak position appearing on the histogram.

4. The image processing method of claim 1, further comprising:
    producing a first average-value image by applying a two-dimensional smoothing filter to the absolute-value image; producing a differential image by subtracting the average-value image from the original absolute-value image; producing a differential square image by squaring pixel values in the differential image; producing a second average-value image by applying a two-dimensional smoothing filter to the differential square image; generating a histogram of pixel values in the second average-value image; performing curve fitting on the histogram to obtain a curve function; and calculating a standard deviation $\alpha$ of noise from parameters of the curve function.

5. The image processing method of claim 4, wherein a Gaussian distribution function is used as the curve function.

6. The image processing method of claim 4, wherein a Rayleigh distribution function is used as the curve function.

7. An image processing method for calculating from an absolute-value image produced by complex observed signals S a variance $\delta^2$ of the original complex observed signals S in a local region on the absolute-value image, comprising the steps of:
    calculating an average value M by the image processing method of claim 1; calculating $\Sigma|S|^2/k$ by dividing a square sum of pixel values |S| of the absolute-value image in the local region by the number of pixels k; and calculating the variance $\delta^2$ by:

$$\delta^2 = \Sigma|S|^2/k - M^2.$$

8. An image processing method comprising the steps of:
    calculating a variance $\delta^2$ of original complex observed signals S in a proximate region of a pixel of interest on an absolute-value image produced by the complex observed signals S according to the image processing method of claim 7; comparing a variance $\alpha^2$ of noise contained in the complex observed signals S and the variance $\delta^2$ of the complex observed signals S; and if the variance $\delta^2$ of the complex observed signals S is equal to or relatively close to the variance $\alpha^2$ of noise, setting the pixel value for the pixel of interest to a value in which the average value of pixel values of the pixel of interest and the surrounding pixels dominates, and if the variance $\delta^2$ of the complex observed signals S is relatively far from the variance $\alpha^2$ of noise, setting the pixel value for the pixel of interest to a value in which the original pixel value dominates.

9. The image producing method of claim 8, further comprising: calculating a ratio between the variance $\delta^2$ of the complex observed signals S and the variance $\alpha^2$ of noise; setting a weight W=1 when the ratio is equal to "1" and reducing the weight W from "1" as the ratio goes away from "1"; and calculating a new pixel value $|S|_{new}$ for the pixel of interest by:

$$|S|_{new} = W \cdot Ma + (1-W)|S|,$$

wherein the pixel value of the pixel of interest is represented as $|S|$, and the average value of pixel values of the pixel of interest and the surrounding pixels is represented as Ma.

10. A recording medium which records in a computer-readable manner a program for making a computer perform the image processing method of claim 1.

11. An image processing apparatus for calculating from an absolute-value image produced by complex observed signals S an average value M of the original complex observed signals S in a local region on the absolute-value image, comprising:
a first calculating device for calculating an average value Ma of pixel values in a region; and
a second calculating device for calculating the average value M by:

$$M = \alpha \cdot f^{-1}(Ma/\alpha),$$

wherein the function $Ma/\alpha = f(M/\alpha)$ is represented by:

$$Ma/\alpha = \int\int \{|M/\alpha + (X+iY)| \exp\{-(X^2+Y^2)/2\}/2\pi\} dX\, dY,$$

and the standard deviation of noise contained in the complex observed signals S is represented by $\alpha$, and the respective axes along which the gradients are generated are represented by X and Y.

12. The image processing apparatus of claim 11, wherein said second calculating device uses an inverse function $F^{-1}(Ma/\alpha)$ of an approximated function $F(M/\alpha)$ of the function $f(M/\alpha)$ instead of $f^{-1}(Ma/\alpha)$.

13. The image processing apparatus of claim 11, further comprising: a first average-value image producing device for producing a first average-value image by applying a two-dimensional smoothing filter to the absolute-value image; a differential image producing device for producing a differential image by subtracting the average-value image from the original absolute-value image; a differential square image producing device for producing a differential square image by squaring pixel values in the differential image; a second average-value image producing device for producing a second average-value image by applying a two-dimensional smoothing filter to the differential square image; a histogram generating device for generating a histogram of pixel values in the second average-value image; and a standard deviation calculating device for calculating a standard deviation $\alpha$ of noise from a peak position appearing on the histogram.

14. The image processing apparatus of claim 11, further comprising:
a first average-value image producing device for producing a first average-value image by applying a two-dimensional smoothing filter to the absolute-value image; a differential image producing device for producing a differential image by subtracting the average-value image from the original absolute-value image; a differential square image producing device for producing a differential square image by squaring pixel values in the differential image; a second average-value image producing device for producing a second average-value image by applying a two-dimensional smoothing filter to the differential square image; a histogram generating device for generating a histogram of pixel values in the second average-value image; a curve fitting device for performing curve fitting on the histogram to obtain a curve function; and a standard deviation calculating device for calculating a standard deviation $\alpha$ of noise from parameters of the curve function.

15. The image processing apparatus of claim 14, wherein said curve fitting device uses a Gaussian distribution function as the curve function.

16. The image processing apparatus as defined in claim 14, wherein said curve fitting device uses a Rayleigh distribution function as the curve function.

17. An image processing apparatus for calculating from an absolute-value image produced by complex observed signals S a variance $\delta^2$ of the original complex observed signals S in a local region on the absolute-value image, comprising:
the image processing apparatus of claim 11; a first-term calculating device for calculating $\Sigma|S|^2/k$ by dividing a square sum of pixel values $|S|$ of the absolute-value image in a region by the number of pixels; and a variance calculating device for calculating the variance $\delta^2$ by:

$$\delta^2 = \Sigma|S|^2/k - M^2.$$

18. An image processing apparatus comprising:
the image processing apparatus of claim 17 for calculating a variance $\delta^2$ of original complex observed signals S in a proximate region of a pixel of interest on an absolute-value image produced by the complex observed signals S; a comparing device for comparing a variance $\alpha^2$ of noise contained in the complex observed signals S and the variance $\delta^2$ of the complex observed signals S; and an image filtering device for, if the variance $\delta^2$ of the complex observed signals S is equal to or relatively close to the variance $\alpha^2$ of noise, setting the pixel value for the pixel of interest to a value in which the average value of pixel values of the pixel of interest and the surrounding pixels dominates, and if the variance $\delta^2$ of the complex observed signals S is relatively far from the variance $\alpha^2$ of noise, setting the pixel value for the pixel of interest to a value in which the original pixel value dominates.

19. The image producing apparatus of claim 18, wherein said image filtering device calculates a ratio between the variance $\delta^2$ of the complex observed signals S and the variance $\alpha^2$ of noise, sets a weight W=1 when the ratio is equal to "1" and reduces the weight W from "1" as the ratio goes away from "1"; and calculates a new pixel value $|S|_{new}$ for the pixel of interest by:

$$|S|_{new} = W \cdot Ma + (1-W)|S|,$$

wherein the pixel value of the pixel of interest is represented as $|S|$, and the average value of pixel values of the pixel of interest and the surrounding pixels is represented as Ma.

20. An MRI apparatus comprising the image processing apparatus of claim 11.

* * * * *